United States Patent Office 2,974,573
Patented Mar. 14, 1961

2,974,573

SUPPLEMENTARY OPTICAL SYSTEM FOR PHOTOGRAPHIC CAMERAS

Werner Faasch, Braunschweig, Germany, assignor to Franke & Heidecke, Fabrik Photographischer Prazisions-Apparate, Braunschweig, Germany, a German firm Filed May 8, 1957, Ser. No. 657,957

Claims priority, application Germany May 12, 1956

15 Claims. (Cl. 95—42)

This invention relates to photographic cameras, and more particularly to the provision of a supplementary optical system for such cameras.

An object of the invention is the provision of an attachment or accessory for photographic cameras, so designed that the camera may be used easily and conveniently with interchangeable lenses designed for special photographic purposes (such as microphotography and telephotography) without removing the normal or regular lens of the camera.

Another object is the provision of such an attachment so designed that pictures taken with the supplementary attachment will fill the normal picture area of the film in the camera, although the interchangeable lenses may be relatively small.

Still another object is the provision of an attachment having finder and focusing means conveniently operable, so that the photographer may focus easily upon the object to be photographed and may readily observe the lateral limits of the field of view.

A further object is the provision of a camera attachment which itself may have interchangeable objective lenses, without requiring any change in the normal or regular lens of the camera with which the attachment is used, and one in which, at the same time, the normal picture area of the camera will be fully utilized.

A still further object is the provision of such an attachment in which the interchangeable objective lens is so designed as to be comparatively small and inexpensive, thus facilitating the provision of a plurality of interchangeable objective lenses, yet without detracting from the ability of filling or utilizing the normal picture area of the camera.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
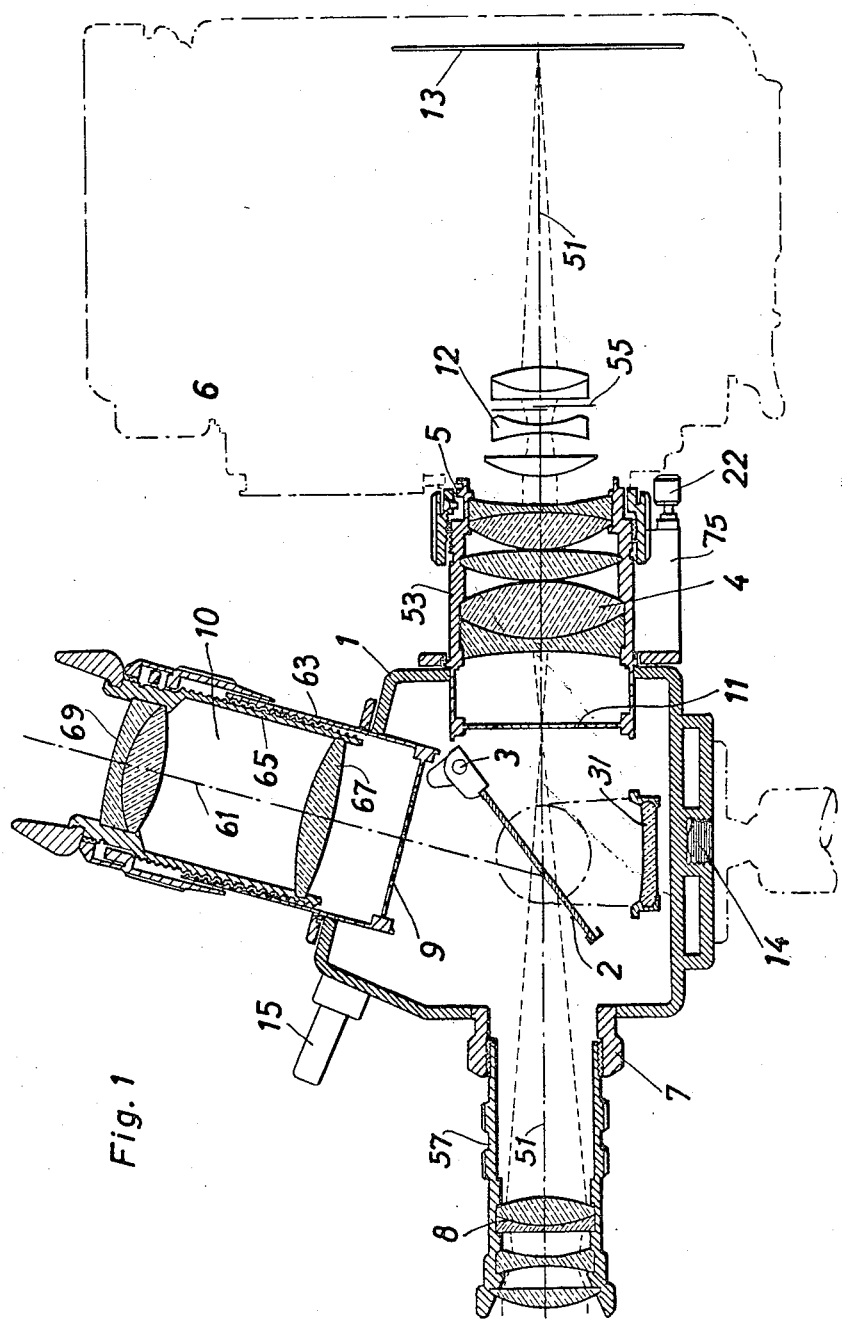
Fig. 1 is an axial section through a device in accordance with a preferred embodiment of the invention, showing it attached to a twin lens reflex camera, the outline of which is indicated in broken lines.

The apparatus of the present invention is intended particularly but not exclusively for use in connection with a twin lens reflex camera of the kind having an objective shutter and a permanently mounted objective lens, such as either one of the two closely related cameras identified by the trademarks "Rolleiflex" and "Rolleicord," both manufactured by the firm of Franke & Heidecke, of Braunschweig, Germany, and widely known and used in the United States of America and elsewhere. The following disclosure presupposes general familiarity with these cameras in the forms in which they are currently being sold in the United States. Those who are not already familiar with the general constructional features of these cameras may obtain further information by consulting the reference book "Rollei Photography; Handbook of the Rolleiflex and Rolleicord Cameras" by Jacob Deschin, published 1952 by Camera Craft Publishing Company, of San Francisco, California. The body of a "Rolleiflex" camera is indicated at 6 in the accompanying drawings.

When using a twin lens reflex camera, such as the particular cameras mentioned, it is sometimes desired to undertake special kinds of photography, such as microphotography, macrophotography, or telephotography. This requires special lenses. But in the particular cameras specifically mentioned above, interchangeable lenses are not used, and the regular or normal lens could be removed only with difficulty. Also, in these particular cameras as well as in twin lens reflex cameras in general, use of a supplementary lens of any expensive type is not practical because there is no way of focusing the camera unless a similar lens at duplicate expense is used on the finder. Moreover, even if the photographer wishes to go to the trouble of removing the lens and replacing it with another, and wishes to incur the double expense of another similar lens for the finder, there is no provision in these cameras for protecting the film against stray light while the lens is being removed and replaced. Therefore, there would be a wastage of film if the camera is already loaded with a roll of film perhaps partly used at the time that it is attempted to remove and replace the lens.

The present invention provides a device in the nature of a supplementary attachment or accessory, which can be secured to the camera without disturbing the existing normal or ordinary lens of the camera and which permits the making of microphotographs or telephotographs with adequate possibility for interchangeable objective lenses on the attachment or accessory, without disturbing the regular lens of the camera. Moreover, the attachment or accessory of the present invention includes means for utilizing the full picture area of the camera (rather than wasting part of the normal picture area) and also means for focusing the device accurately upon the object being photographed, and for observing the limiting edges of the field of view, since the normal viewfinder chamber of the twin lens reflex camera cannot be used for these purposes when the attachment is applied to the camera.

Referring now to the drawings, and first to Fig. 1 thereof, the device of the present invention comprises a boxlike housing or casing 1 through which extends a main optical axis 51. A mirror 2 mounted on a pivot 3 laterally offset from the optical axis 51 may be swung from a position intersecting the optical axis as seen in Fig. 1 to a position approximately parallel to the optical axis and in non-obstructing relation to light passing along the optical axis.

At its rear or camera-engaging end, the device has a lens tube 53 secured to the housing 1 in concentric relation to the optical axis 51. This lens tube 53 carries the objective lens 4, which may comprise several optical elements or components as illustrated in Fig. 1, all collectively referred to as the lens. At the rear end of the lens tube 53, and suitably fastened thereto, is the bayonet mount diagrammatically illustrated at 5, of the proper size and shape to interengage with the usual bayonet mounting lugs customarily found in surrounding relation to the front end of the lens mount of the picture taking lens of a "Rolleiflex" camera. The lens mount of the camera contains the usual normal camera lens 12 for taking the picture, adapted to project light onto the picture area of the film in the focal plane as indicated diagrammatically at 13. The usual objective shutter indicated diagrammatically at 55 is mounted adjacent the lens 12, and the camera body also has the usual finder lens with its axis parallel to the axis of the lens 12, for projecting an image into the usual reflex finder and focusing chamber, the finder lens and focusing screen not being shown in the present drawings but being well understood by those familiar with cameras of this kind.

At the other end or object end of the main housing 1 there is a lens tube 7 interchangeably mounted on the housing as by means of a bayonet connection joint or by suitable screw threads, in concentric relation to the main optical axis 51. A forward extension 57 is mounted on the lens tube part 7 and is axially movable thereon by screw threads or the like, for focusing purposes. This focusing extension 57 carries, in this instance, a telescopic objective lens 8, consisting of any desired number of optical elements or components, all collectively referred to as the lens.

When the mirror 2 is in the normal rest position illustrated in Fig. 1, intersecting the optical axis 51, the beam of light from the object to be photographed, entering through the objective 8 and passing rearwardly along the optical axis 51, is deflected by the mirror 2 in the oblique lateral direction of the axis 61 and is focused in the plane of the optical element 9 which extends transverse to this lateral optical axis 61. The element indicated diagrammatically at 9 may be of various forms; for example, a ground glass or other suitable focusing screen surface, or a thin translucent plate of any suitable kind, or a thick transparent plate having markings of different kinds on opposite faces as will be further mentioned hereafter in greater detail. Also, the element 9 may be a simple diaphragm or screen defining the permissible outline or perimeter of the field of view of the device. Or it may be a combination of such a diaphragm with a translucent focusing screen.

Further beyond the element 9, in the direction of the axis 61, is a focusing eyepiece indicated in general at 10. Preferably there is an eyepiece tube 63 interchangeably mounted on the housing or casing 1 as by means of a bayonet connection, which carries the optical element 9 at its lower or inner end, and which has screw threads engaging threads of the movable tube 65 of the eyepiece, both tubes being concentric with the lateral optical axis 61. By turning the tube 65, it is caused to travel axially along the tube 63, thereby focusing the eyepiece lens elements 67 and 69, moving them axially relative to the element 9.

When the mirror 2 is swung aside to a position parallel to the optical axis 51, so that it no longer obstructs passage of light rearwardly along this optical axis, then the light beam, instead of being deflected to the axis 61 passes rearwardly along the main optical axis 51 and is focused in the plane of element 11 which is at the same distance from the objective 8 (along the optical path) as the element 9. This element 11 is an image field diaphragm. The intermediate image formed in the plane 11 of the objective 8 is projected by the lens 4 in a parallel bundle of rays focused at infinity. Therefore, if the regular camera lens 12 is set in its infinity focus position, the intermediate image formed at 11 will be correctly focused onto the plane of the film 13 in the camera. In this connection it may be mentioned that, as well understood by those familiar with "Rolleiflex" and "Rolleicord" cameras, the picture taking lens 12 of the camera as well as the corresponding viewfinder lens are both mounted on a front member or lens support which is movable axially forwardly and rearwardly for focusing purposes, movement being accomplished by a focusing knob 70 mounted on the left side wall of the camera body, which knob is graduated for various focus distances. When using the camera with the accessory or attachment according to the present invention, this focusing knob of the camera is set at the infinity focus position.

According to the invention, the lens 4 is of such dimensions that it not only will focus the intermediate image 11 correctly on the film 13 (when the regular lens 12 is in its infinity focus position) but also will produce an image which fills the normal picture area or frame area of the film 13, without wasting part of the normal picture area, even though the intermediate image 11 is considerably smaller than the size of the image on the film 13. One of the advantageous features of the present invention is that the intermediate image 11 may be relatively small (for example, about ⅓ or ¼ of the size of the final image on the film 13) with consequent saving in size of the interchangeable objective 8, but without sacrifice of the size of the ultimate image on the film. To accomplish this, the lens 4 is made of large relative aperture or diameter, larger than that of the regular camera lens 12, as well seen in Fig. 1, to prevent optical or mechanical restricting or affecting the picture size. The extra expense involved in making the lens 4 of relatively large diameter or aperture is more than compensated for, however, by the fact that the interchangeable lens 8 may be of relatively small diameter or aperture or of inexpensive design, because there is only one lens 4 constituting part of each attachment or accessory, whereas each attachment or accessory may have several interchangeable objectives 8 of different characteristics (e.g., one or more telescopic lenses and a microscopic lens) all of which can be of relatively small diameter with a consequent saving in cost.

For example the normal picture area on the film 13 may have a size of 6 x 6 centimeters, and the intermediate image in the plane of the element 11 may be only of a size of 2 x 2 centimeters. Under these conditions, an objective 8 having a focal length of only 50 centimeters, when used in conjunction with a device according to the present invention, will have the same effect as a telescopic lens with a focal length of 150 centimeters used directly as the camera lens. It is seen, therefore, that our producing telescopic photographs of a given magnification and size, the present invention enables a considerable saving as regards the size, weight, circumference, and therefore cost of the telescopic lens, which far outweighs the larger dimensions and larger cost of the intermediate lens 4 used in the present construction.

By suitable design of the eyepiece 10 according to known optical principles, the size of the image in the plane 9 may be observed with any desired degree of magnification. The eyepiece lens may be designed so that the image at 9, when seen through the eyepiece, appears the same size as or even enlarged to several times the size of the image on the film 13.

One face of the housing 1 is provided with a threaded socket 14 having a standard camera tripod thread so that the device may be mounted on a camera tripod. When thus mounted, the housing 1 is supported directly on the tripod, while the camera 6 is supported from the accessory by being firmly attached to the accessory through the bayonet mount thereof engaging the bayonet lugs on the camera.

Figure 2:
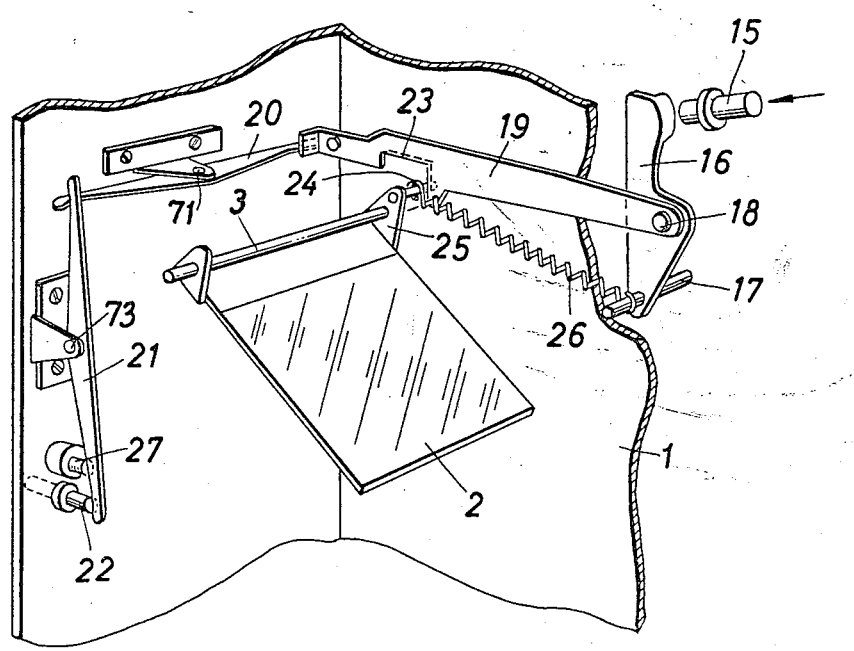
Fig. 2 is a perspective view of a fragment of the construction shown in Fig. 1, illustrating particularly the mechanism for actuating the pivoted mirror and certain other connected parts.

Referring now to Fig. 2, there is here shown the means for actuating the mirror 2 of the accessory or attachment and at the same time making the exposure with the camera. The housing 1 is provided with a release button in the form of a plunger 15 movable axially inwardly when it is desired to make the exposure. The inner end of the plunger 15 engages a lever 16 turnable on a fixed pivot 17. At an intermediate point, the lever 16 is pivotally connected at 18 to one end of a link 19 movable longitudinally, within the casing 1 near one side wall thereof.

The link 19 has a notch 23, the forward edge of which engages a pin 24 on the mirror support or bracket 25 which is pivoted on the pivot 3, this pin 24 being offset with respect to the pivot 3 so that when the link 19 moves rearwardly, the pressure on the pin 24 will swing the mirror up from the intersecting position shown in Fig. 1 to a position parallel to the optical axis 51, against the force of a spring 26, one end of which is attached to the fixed pivot 17 and the other end of which is attached to the pin 24 to tend to pull this pin in a direction to keep the mirror resiliently in the intersecting position shown in Fig. 1.

The rear end of the link 19 engages one end of a double armed lever 20 pivoted intermediate its length on a fixed pivot 71 within the housing 1. The second arm of this lever 20 engages one arm of another double armed lever 21, pivoted intermediate its length on a fixed pivot 73 also within the housing 1. The second arm of this lever 21 engages the inner end of a plunger or pin 22 movable axially through the rear wall of the housing 1 and guided for axial movement in a suitable bracket 75 (Fig. 1) secured to the lens tube 53. This plunger or pin 22 is located in such position that when the attachment or accessory is properly applied to the camera, the rear end of the pin 22 lies immediately in front of the regular camera shutter release button or plunger which is located on the front of the camera near the lower left corner when viewed from the front or lower right corner when viewed from the rear.

With this arrangement, it is seen that picture taking is very simple. The photographer looks through the lateral eyepiece 10, rather than into the normal focusing hood of the twin lens reflex camera. He adjusts the eyepiece to focus sharply upon the image at the location 9. He adjusts the interchangeable objective 8 by turning it, so as to focus the image of the object to any desired degree of sharpness on the location 9, as observed through the eyepiece. When he is satisfied with the sharpness of focus and the field of view, he simply presses the release button or plunger 15 rearwardly. Through the linkage described, this automatically moves the mirror 2 to a non-obstructing position, and also presses rearwardly on the plunger or pin 22 so that the rear end of the latter engages the normal release button of the camera, tripping the shutter to make an exposure. The parts 19, 20, 21 and 22 are purposely designed with a certain amount of lost motion between the contacting surfaces, so that the mirror 2 will reach its non-obstructive position before the pin 22 moves far enough to trip the shutter.

The lever 21 also engages an electric switch closing plunger 27, the switch of which may be connected by a conductor cord to a battery and flash bulb or other suitable photographic flash illumination apparatus. Thus the flash circuit is closed simultaneously with the movement of the plunger 22 to trip the shutter, synchronizing the flash with the shutter operation.

Figure 3:
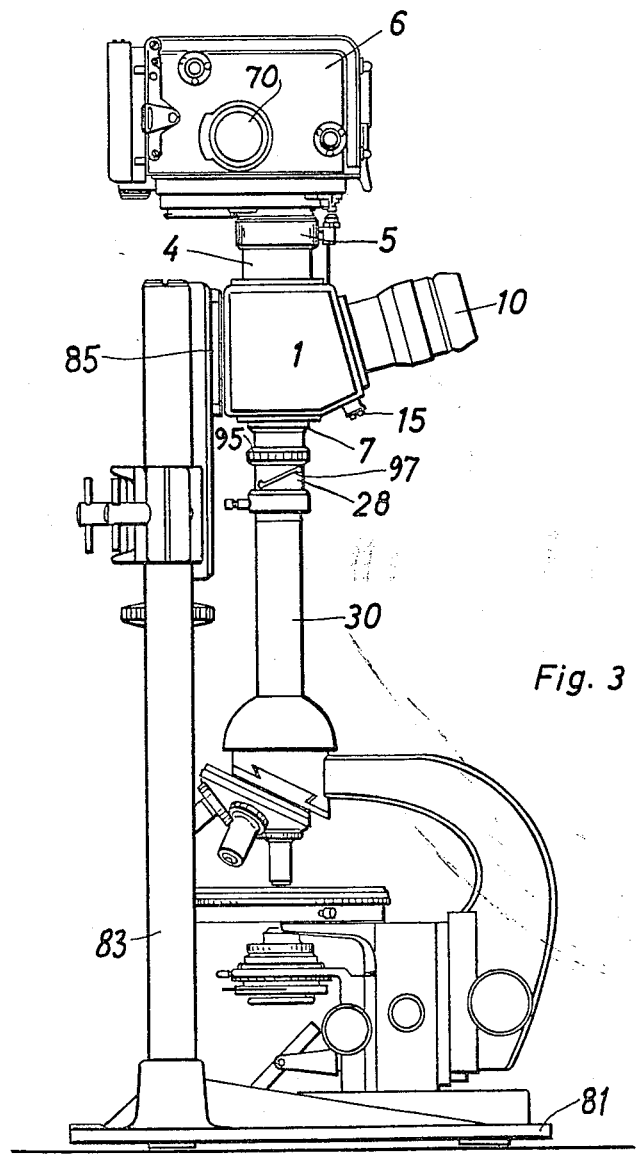
Fig. 3 is a side elevation of the device together with the camera mounted thereon, a supporting stand, and a microscope, the various parts collectively forming a complete arrangement for microphotography.

When the device is to be used for microphotography rather than telescopic photography, the change is easily made. The detachable or interchangeable lens mount 7 is removed from the casing 1, and is replaced by another lens mount 7, similarly fitted (by a bayonet connection or the like) to the casing 1, but provided with a different objective lens or lenses, more suited to the microphotography desired. A suitable set-up for microphotography is illustrated diagrammatically in Fig. 3, where there is a microscope stand 81 carrying the microscope 30 of any conventional construction and also carrying an upright post 83 which supports a vertically adjustable bracket 85 provided with a threaded stud for engaging in the threaded tripod socket 14 of the device if it is desired to support or steady the device from the post 83. The telescopic objective is replaced by a microphotographic objective indicated in general at 28, having at its forward end a ring 29 of proper diameter to surround the eyepiece 91 of the microscope 30. A thumb screw 93 on the ring 29 enables the ring to be clamped tightly to the microscope.

The objective 28 is a variable power lens system, sometime called a pancratic system or a zoom lens system. The negative component 33 of the lens system is adjustable axially by turning a knurled adjusting ring 95 which is formed with olique cam slots 97 engaging pins 99 mounted on the lens carrier 101 slidable axially within the fixed lens mount 7. This lens carrier 101 carries the negative element 33, and as the adjusting ring 95 is turned the position of the element 33 will be altered to produce any desired degree of magnification so that the microscope image can be made to fill the designated outline or field of view on the optical elements 9 and 11, which will insure that it will fill the desired picture area on the film 13.

To enable the device to be used more effectively for microphotography as well as telescopic photography, it is preferably provided with a correcting lens element 31 mounted on a lateral bracket carried by a pin or arbor 32 which extends through the side wall of the housing 1 and is externally accessible for turning it manually on an axis of rotation which intersects the main optical axis 51.

Figure 4:
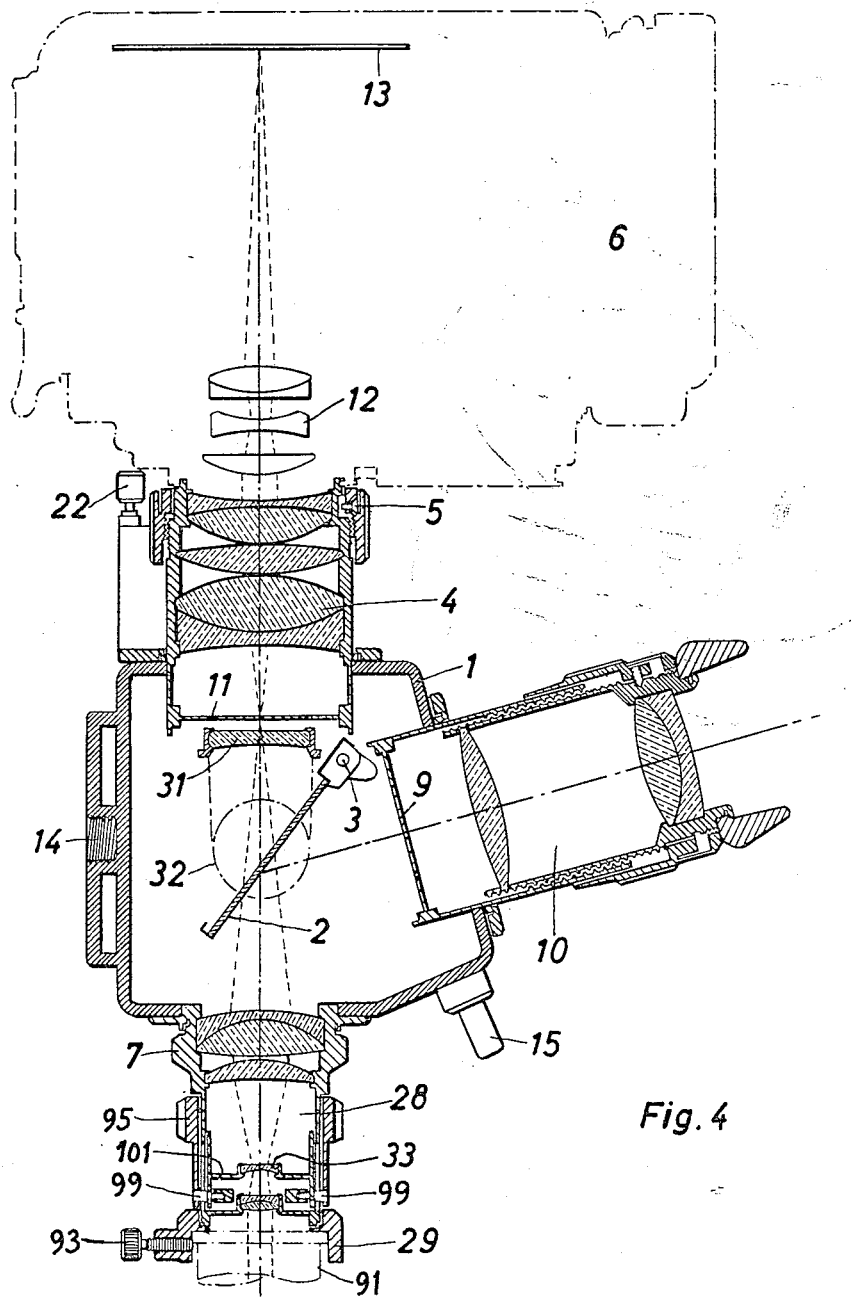
Fig. 4 is an axial section through the device, similar to Fig. 1, but illustrating it with a different objective lens particularly intended for microphotography.

For telephoto photography, the arbor 32 is swung so that the correcting lens 31 is in an ineffective position as shown in Fig. 1. When the device is being used for microphotography, however, or in any other circumstances where undesirable curvature of field would otherwise occur, the arbor 32 may be turned to bring the correcting lens in a position across the optical axis 51, as seen in Fig. 4. This serves to correct the curvature of the image field. It will be noted from Fig. 4 that when the field flattener lens 31 is in its effective position, it is quite close to the image plane 11, so produces its flattening effect without having any large effect upon the power of the lens system.

In order to permit easy focusing (through the eyepiece 10) either with or without the use of the correcting lens 31, it is desirable that the optical element 9 on which focusing is accomplished be in the form of a flat glass plate of suitable thickness to compensate for the thickness of the correcting lens 31, and having different markings on the opposite faces of the glass plate. When the correcting lens 31 is in its ineffective position, focusing is accomplished by observing the image on that face of the glass plate which is farther from the observer's eye. When the correcting lens 31 is in the effective position, then focusing is accomplished by observing the image on that face of the glass plate which is closer to the observer's eye, the thickness of the plate compensating for the axial displacement of image caused by the correcting lens 31. Thus if the image (when the beam of light is deflected by the mirror 2) is correctly focused on the near side of the glass plate 9, it is known that the image will be correctly focused in the plane 11 when the mirror 2 is swung aside, if the correcting lens 31 is used.

The entire eyepiece structure 10 is preferably quickly detachable from the housing 1, as by means of a bayonet joint, for example, so as to obtain easy access to the inner end of the eyepiece assembly so that the thick glass plate just mentioned may be replaced by a ground glass focusing screen and vice versa. At times, namely in focusing microscopic pictures, it is desired to use the thick glass plate and at other times, e.g., in taking telephoto or macroscopic pictures, it is preferable to have a ground glass focusing screen or other suitable interchangeable element in the location 9, instead of the thick glass plate with different markings on its opposite faces.

Another reason for making the eyepiece 10 readily detachable from the casing 1, is that it enables various interchangeable eyepieces to be used, if desired. Thus, for example, one eyepiece of suitable magnification power may be used for ordinary photographic purposes other than microscope photography. Another special eyepiece may be used for microscope photography, the magnification power of this special eyepiece being so designed that when looking through the eyepiece the observer will see the object in the same size as he would see it if he were looking directly into the regular eyepiece of the microscope itself.

It will be noted that the invention permits the use of various interchangeable lenses including special lenses for telescopic photography and special lenses for microscopic photography, with a roll film camera which does not have interchangeable or replaceable lenses. Also the attachment may be used, and the interchangeable lenses of the attachment may be changed, without subjecting the film in the camera to fogging or accidental exposure. The camera itself is not opened up either when securing the attachment to the camera or when changing the interchangeable lenses of the attachment, the film in the camera being protected at all times by the regular shutter 55 of the camera, which is opened only when an exposure is to be made. This is an important distinction from certain prior proposals for using supplementary attachments with cameras, these prior proposals requiring that the regular camera lenses be taken out when the attachment is to be used, thus opening up the camera and fogging any film that may be in the camera at that time, unless the film is then protected by a curtain shutter or other special means. It may be noted that the present invention also permits special photographic projects to be carried out by a roll film twin lens reflex camera, because special focusing means is provided as part of the present device or attachment, the regular focusing means of the camera being ineffective or unusable at this time.

If desired, a semi-transparent mirror or beam-splitter may be substituted for the opaque mirror 2, so that the image of the object is transmitted simultaneously to both locations 9 and 11, without moving the mirror.

It is seen from the foregoing disclosure that the above mentioned objects of the invention are well fulfilled. It is to be understood that the foregong disclosure is given by way of illustrative example only, rather than by way of limitation, and that without departing from the invention, the details may be varied within the scope of the appended claims.

What is claimed is:

1. A supplementary optical device to enable the use of interchangeable lenses with a photographic camera having a lens not intended for interchangeability, said device comprising a housing for mounting in front of the lens of the camera with which the device is to be used, a first objective lens interchangeably mounted near the front of said housing for axial focusing movement relative thereto, said first objective lens focusing an image of an external object at an intermediate image plane within said housing, a second objective lens mounted between said intermediate image plane and the lens of the camera and serving, in conjunction with the lens of the camera, to project an image from said intermediate image plane to a film plane within the camera, a finder eyepiece assembly located between said first and second objective lenses and offset laterally from an optical axis passing through said first and second objective lenses, and mirror means located between said first objective lens and said intermediate image plane for deflecting light from said optical axis to said eyepiece assembly.

2. A construction as defined in claim 1, in which said eyepiece assembly includes an image receiving element at the same optical distance from said first objective lens as the optical distance from said first objective lens to said intermediate image plane, so that when said first objective lens is properly focused with respect to said receiving element, it will also be properly focused with respect to said image plane.

3. A construction as defined in claim 2, in which said eyepiece assembly includes a lens axially movable with respect to said image receiving element.

4. A construction as defined in claim 1, in which said second objective lens is in a fixed position to focus said intermediate image plane at infinity, so that when the lens of the camera is set in infinity focus position, said intermediate image plane will be focused on the film plane of the camera.

5. A construction as defined in claim 4, in which the distance from said intermediate image plane to said second objective lens is substantially less than the distance from said camera lens to the film plane of the camera, so that the projected image of a given object in the film plane of the camera will be substantially larger than the image thereof in said intermediate image plane.

6. A construction as defined in claim 1, in which said second objective lens has a diameter substantially greater than that of said first objective lens.

7. A construction as defined in claim 1, wherein said supplementary device in combination with a photographic camera is useful in telephotography and also in microphotography, further including a negative lens for correcting curvature of field, and an adjustable member mounting said negative lens and movable to shift said negative lens from a first position out of the path of rays passing from said first objective lens toward said intermediate image plane when said device is used for telephotography, to a second position in the path of said rays and relatively close to said intermediate image plane when said device is used for microphotography.

8. A construction as defined in claim 7, further including an eyepiece assembly, said mirror means extending between said first objective lens and said second position of said negative lens for deflecting light to said eyepiece assembly, and a glass plate extending transversely in said eyepiece assembly in position to receive light deflected by said reflecting means, said plate having different markings on which the eye of an observer may be focused on two parallel faces and having a thickness corresponding to the effective optical thickness of said negative lens so that an image on one face of the plate may be observed when composing the view with relation to the marking on one face of said plate when said negative lens is in its first position and an image on the opposite face of the plate may be observed when composing the view with relation to the marking on the opposite face of said plate when said negative lens is in its second position.

9. A construction as defined in claim 1, in which said first objective lens is a variable power objective lens, so that the magnifying power thereof may be varied to match the size of the image produced in the film plane of the camera with the available size of the picture area of the camera.

10. The combination with a photographic camera having a film plane and having a camera lens axially movable toward and away from said plane for focusing an image on said plane, of an accessory device attachable to said camera in front of said camera lens, said device comprising a first objective lens spaced substantially forwardly from the camera for imaging an object at an intermediate image plane between said first objective lens and said camera, a second objective lens located between said image plane and said camera directly in front of the camera lens, said second lens being alined with said camera lens and being effective, in combination with said camera lens, to project an image from said image plane onto said film plane, a finder element located between said first and second objective lenses and offset laterally from an optical axis passing from said first objective lens to said second objective lens, light deflecting means interposed between said first objective lens and said intermediate image plane for deflecting light to said finder element to form an image at said finder element, and eyepiece lens means for observing the image at said finder element.

11. A construction as defined in claim 10, in which said first objective lens is interchangeable.

12. A construction as defined in claim 10, in which said first objective lens is a pancratic lens system having variable power of magnification.

13. A construction as defined in claim 10, in which said second objective lens in combination with said camera lens produces an image on said film plane of larger size than the image at said intermediate image plane.

14. A construction as defined in claim 10, wherein said device in combination with the photographic camera is useful in microphotography as well as in telephotography, and further including a field flattening correcting lens movable to and from an effective position in front of and relatively close to said intermediate image plane when used respectively for microphotography and telephotography.

15. A construction as defined in claim 10, in which said camera has a release plunger movable to initiate an exposure and in which said light deflecting means of said device is swingable from an effective deflecting position to an ineffective position, further including manually operable means on said device for swinging said deflecting means from effective position to ineffective position and concomitantly moving said release plunger of said camera to make an exposure.

References Cited in the file of this patent

UNITED STATES PATENTS

| | | |
|---|---|---|
| 1,528,931 | Lihotzky | Mar. 10, 1925 |
| 1,573,401 | Heine | Feb. 16, 1926 |
| 1,721,208 | Currier et al. | July 16, 1929 |
| 2,550,698 | King et al. | May 1, 1951 |
| 2,604,832 | Barcus | July 29, 1952 |

FOREIGN PATENTS

| | | |
|---|---|---|
| 815,745 | Germany | Nov. 29, 1951 |